US012651497B2

(12) United States Patent
Stewart

(10) Patent No.: US 12,651,497 B2
(45) Date of Patent: Jun. 9, 2026

(54) REMOVABLE DIGITAL IDENTIFICATION SYSTEM FOR INDUSTRIAL SAFETY LOCKS

(71) Applicant: Bryan Wallace Stewart, Weston, MA (US)

(72) Inventor: Bryan Wallace Stewart, Weston, MA (US)

( * ) Notice: Subject to any disclaimer, the term of this patent is extended or adjusted under 35 U.S.C. 154(b) by 0 days.

(21) Appl. No.: 18/629,195

(22) Filed: Apr. 8, 2024

(65) Prior Publication Data

US 2024/0338981 A1 Oct. 10, 2024

Related U.S. Application Data

(60) Provisional application No. 63/494,489, filed on Apr. 6, 2023.

(51) Int. Cl.
*G07C 9/00* (2020.01)
*G06K 7/14* (2006.01)

(52) U.S. Cl.
CPC ....... *G07C 9/00182* (2013.01); *G06K 7/1417* (2013.01); *G07C 9/00571* (2013.01)

(58) Field of Classification Search
None
See application file for complete search history.

(56) References Cited

U.S. PATENT DOCUMENTS 4,417,410 A 11/1983 Freedom
6,144,301 A 11/2000 Frieden

| 6,994,262 B1 * | 2/2006 | Warther | G09F 3/02 |
| | | | 235/492 |
| 7,907,732 B2 | 3/2011 | Yarvis | |
| 9,659,424 B2 | 5/2017 | Huber et al. | |
| 9,804,590 B2 | 10/2017 | Michalscheck et al. | |
| 9,965,910 B2 * | 5/2018 | Kalous | E05B 65/48 |
| 10,614,646 B1 | 4/2020 | Douglass et al. | |
| 10,636,266 B2 * | 4/2020 | Vargas | G08B 13/2451 |
| 10,708,410 B2 | 7/2020 | Gerhardt et al. | |
| 10,922,747 B2 | 2/2021 | Minsley et al. | |
| 11,098,500 B2 * | 8/2021 | Gengler | E05B 67/22 |
| 11,501,585 B2 | 11/2022 | Stenlund | |
| 11,663,650 B2 | 5/2023 | Minsley et al. | |
| 11,804,091 B2 | 10/2023 | Cheung | |
| 11,857,049 B2 | 1/2024 | Karan | |

(Continued)

*Primary Examiner* — K. Wong
(74) *Attorney, Agent, or Firm* — Dunlap Bennett & Ludwig PLLC

(57) ABSTRACT

A lockout-tagout (LOTO) system provides a lock mechanism configured to physically lock a LOTO equipment; a systemic processor; and a two-dimensional matrix barcode connected to the lock mechanism, wherein the one or more authorized user identifiers is configured so that the systemic processor transmits electromagnetic signals to a computing device that reads the two-dimensional matrix barcode, wherein the electromagnetic signals open a user interface of the computing device and renders a user data set thereon, wherein the user data set provides one or more authorized user identifiers and a call button rendering enabling one touch dialing between the computing device and an authorized user associated with the one or more authorized user identifiers, and wherein the systemic processor is configured to link the user field index and the one or more supervisor accounts so that only a linked supervisor account has write access to the user field index.

7 Claims, 10 Drawing Sheets

(56)    References Cited

U.S. PATENT DOCUMENTS

| | | |
|---|---|---|
| 11,880,181 B2 | 1/2024 | Pratt, Jr. et al. |
| 2013/0257590 A1 | 10/2013 | Kuenzi et al. |
| 2021/0396049 A1 | 12/2021 | Chen et al. |
| 2022/0076514 A1 | 3/2022 | Lingala et al. |
| 2023/0215232 A1 | 7/2023 | Gorkovenko et al. |

* cited by examiner

REMOVABLE DIGITAL IDENTIFICATION SYSTEM FOR INDUSTRIAL SAFETY LOCKS

CROSS-REFERENCE TO RELATED APPLICATION

This application claims the benefit of priority of U.S. provisional application No. 63/494,489, filed 6 Apr. 2023, the contents of which are herein incorporated by reference.

BACKGROUND OF THE INVENTION

The present invention relates to lockout/tagout practices and procedures and, more particularly, to a digital lockout/tagout management system.

According to Occupational Safety and Health Administration (OSHA), energy sources including electrical, mechanical, hydraulic, pneumatic, chemical, thermal, or other sources in machines and equipment can be hazardous to workers. During the servicing and maintenance of such machines and equipment, the unexpected startup or release of stored energy can result in serious injury or death to workers. As a result, proper lockout/tagout (LOTO) practices and procedures are mandatory to safeguard workers from hazardous energy releases.

Conventional industrial safety locks for compliance with LOTO practices and procedures include a lock and a paper label used for identifying an operator. And as such, industrial safety locks are assigned to a single operator on a single project, and, therefore, their use results in an increase in operating expense and industrial waste and in efficiencies with that one operator is not readily available. These issues are compounded in cases where standard practice requires multiple safety locks for a single job.

As an example, in an industrial complex providing operational assets, such as power generation equipment, several members of a maintenance crew assigned to perform a maintenance task on the equipment may need to lock up an industrial component or group lock box that secures the power to the effected equipment to isolate the power to the equipment; rendering it safe for personnel to work. In many cases, multiple devices are locked, and the keys are collectively placed in a common "satellite" or "gang" box. The workers then place their individual locks on that satellite or gang box that contains the keys. This allows larger groups to work on the equipment safely protected from the equipment being started or energized.

In this example, using standard industrial safety locks and current industry practice alone, the work crew members take operational control of the specific asset by using a permanently assigned safety lock to prevent access to or use of the asset. A lock is placed on the asset and a paper label identifying the work crew member is applied to the lock. Industrial waste and inefficiencies occur when locks are not able to be shared between work shifts. Standard industry practice does not allow "sharing" of locks once they are assigned to an individual by name, number, and company details. If a shift has a crew size of 20 and each member is permanently assigned 5 locks, and further if the project consists of 3 shifts, the lock usage would be 300 total locks.

As stated above, industrial safety locks are not reusable, creating a lot of waste. These current devices also provide poor repeatable means of identifying operators. Using prior industry practices, the only way to identify owners of a lock in use was to affix hard-to-read labels to the lock body or replace the lock with a new one. This practice is a wasteful use of resources, especially when multiple locks are required to complete a job. The systems also require cumbersome filing systems to catalog the operator/tag details, which are not electronically searchable and require a lot of physical space.

As can be seen, there is a need for an improved industrial safety lock and system of use.

SUMMARY OF THE INVENTION

The present invention embodies a removable digital identification system for industrial safety locks, whereby a single user can carry their own reusable lock cover, which can be operatively associated with any standard industrial lock. The reusable lock cover provides a digitally scannable first set of data associated with the user (a user data set) that is operatively associated to a retrieval system.

The present invention contemplates a removable digital identification system configured to create smart or digital tag that can be affixed to any device of any size, wherein a user can type in a message and create the digital tag printed with electronically scannable information useful for work related projects so that the digital tag can be physically associated with a LOTO lock on the industrial equipment discussed above.

In one aspect of the present invention, a lockout-tagout (LOTO) system provides the following: a lock mechanism configured to physically lock a LOTO equipment; a systemic processor; and a two-dimensional matrix barcode connected to the lock mechanism, wherein the one or more authorized user identifiers is configured so that the systemic processor transmits electromagnetic signals to a computing device that reads the two-dimensional matrix barcode, wherein the electromagnetic signals open a user interface of the computing device and renders a user data set thereon, wherein the user data set comprises one or more authorized user identifiers and a call button rendering enabling one touch dialing between the computing device and an authorized user associated with the one or more authorized user identifiers.

In another aspect of the present invention, the LOTO system further provides a memory configured to store one or more supervisor accounts, and store a table, list or index of the one or more authorized user identifiers associated with the two-dimensional matrix barcode; and further providing the systemic processor to be configured to link the table and the one or more supervisor accounts so that only a linked supervisor account has write access to the user field index, wherein only the linked supervisor account and onboard the one or more authorized user identifiers to said table, wherein the systemic processor is configured to prompt the computing device for a new user data set if there is no one or more authorized user identifiers stored in the memory that is associated with the read two-dimensional matrix barcode, wherein the one or more authorized user identifiers includes a photo of an authorized user, wherein the one or more authorized user identifiers includes a phone number of an authorized user, wherein the phone number is called via the one-touch dialing, wherein the one or more authorized user identifiers includes a shift identifier associated with the authorized user, wherein the one or more authorized user identifiers includes a company associated with the authorized user, and wherein the computing device is a mobile phone.

These and other features, aspects and advantages of the present invention will become better understood with reference to the following drawings, description and claims.

DETAILED DESCRIPTION OF THE INVENTION

Figure 1:
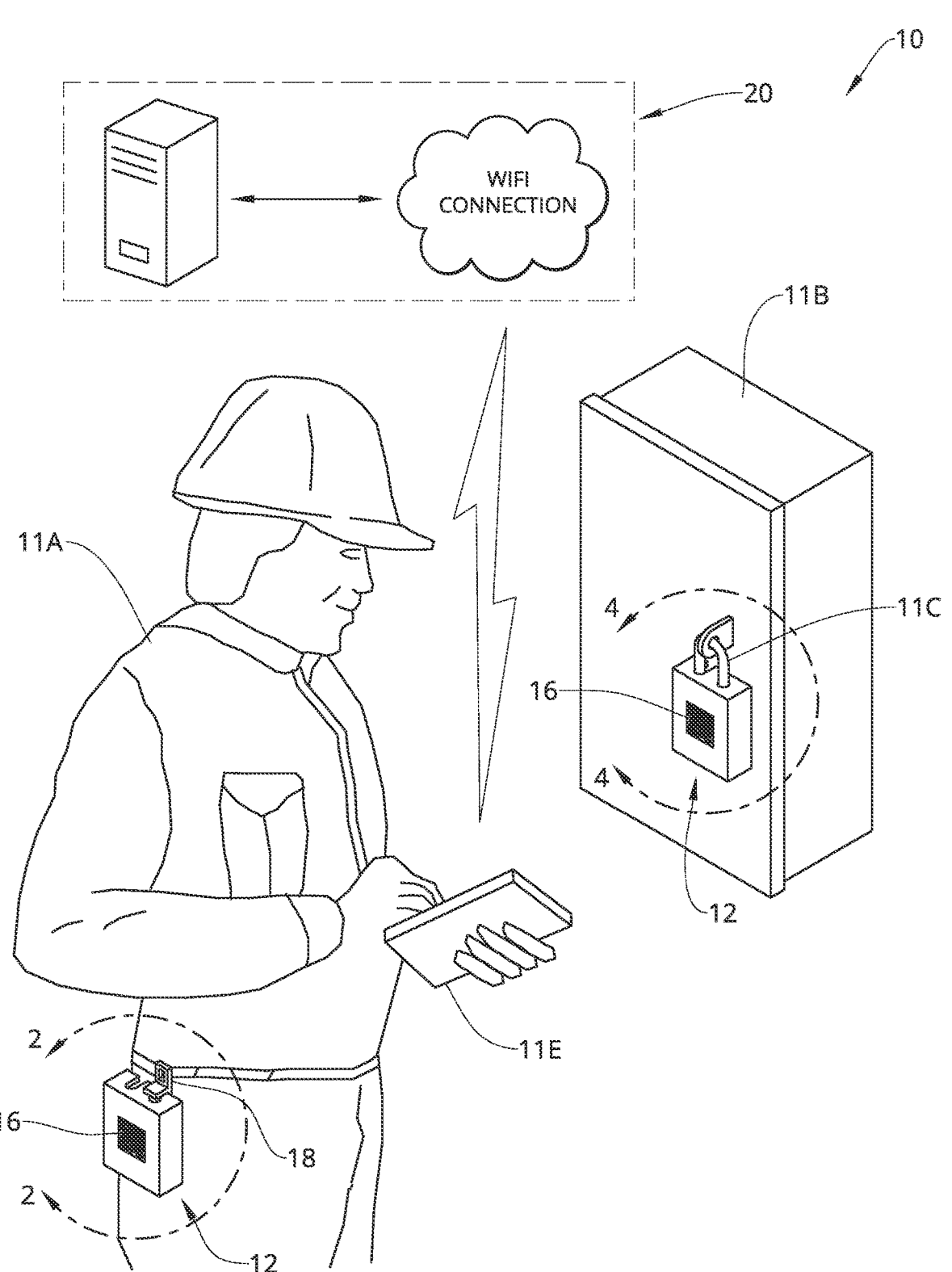
FIG. 1 is a perspective view of an exemplary embodiment of the present invention, shown in use.
Figures 2, 3, 4, 5:
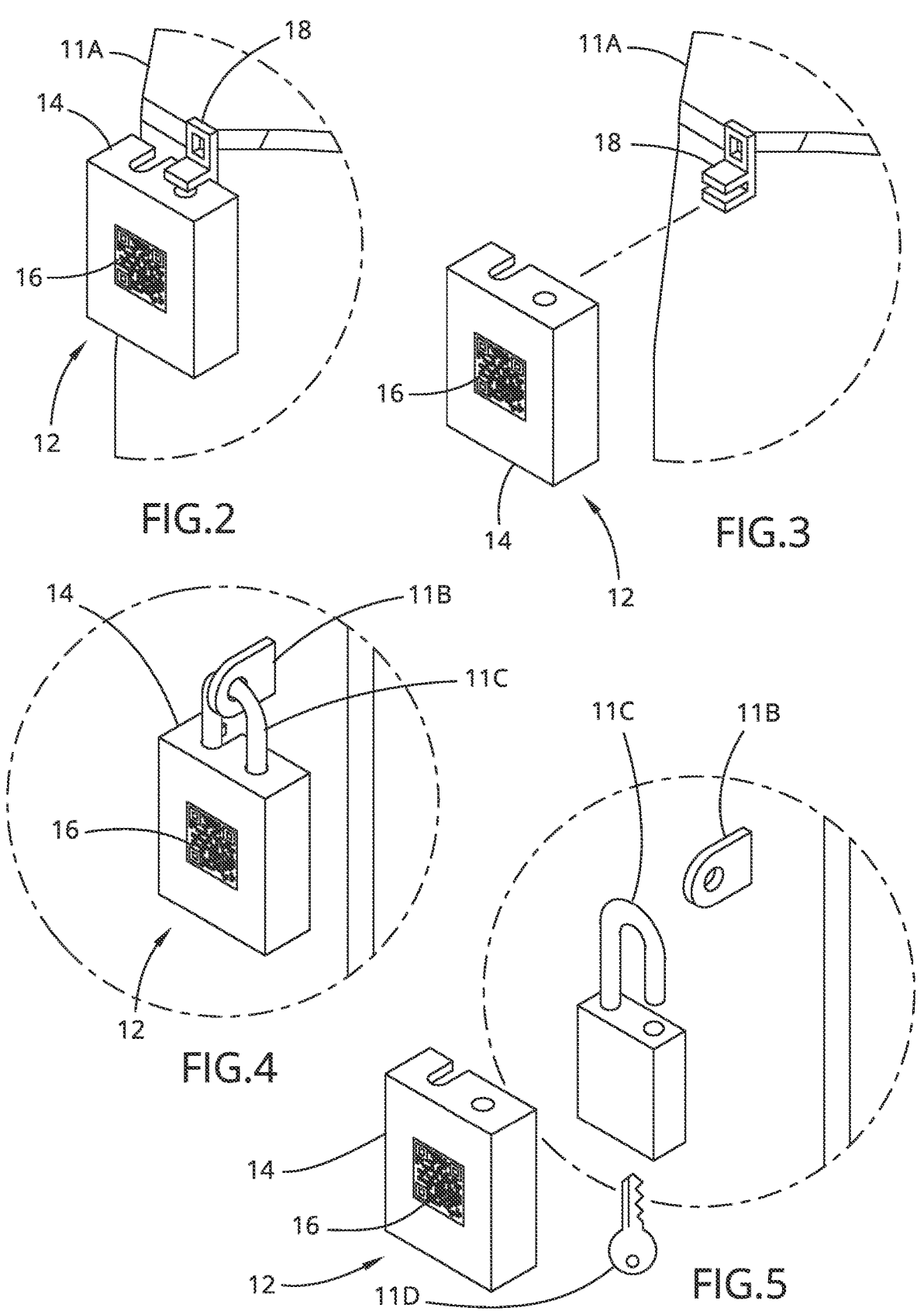
FIG. 2 is a detailed perspective view of an exemplary embodiment of the present invention, indicated by line 2-2 in FIG. 1.
FIG. 3 is an exploded view of FIG. 2.
FIG. 4 is a detailed perspective view of an exemplary embodiment of the present invention, indicated by line 4-4 in FIG. 1.
FIG. 5 is an exploded view of FIG. 4.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides an industrial safety lock management system by providing a digital tag connected to a system for managing digital identities associated with the digital tag, wherein one of the systemic features is a one-touch dial for making instant calls to the tag's owner(s). This system streamlines LOTO audits by making the retrieval process as simple as scanning the digital tag off the LOTO lock. The LOTO lock may provide a digital tag on a lockout cover or directly on the LOTO lock.

The digital tags are easily updated digitally, thereby eliminating the inefficient downsides of a conventional lockout tag, which would otherwise fill up landfills. Tags do not require special software; rather, any device with an optical reader can scan an onboarded (to the industrial safety lock management system of the present invention) detail tag and review the first set of data associated with the user, e.g., worker details or user data. Only supervisors who have onboarded the tag are able to make changes to the first set of data associated with the digital tag. Furthermore, digital tags which do not have a record in the cloud-based management system, are prompted with login and onboarding procedures when scanned.

Referring to FIGS. 1 through 7D, the present invention may include lockout tagout system (LOTOS) 10 for managing the authentication, control, and communication between a lockout device 11C for a lockable component 11B and an authorized user 11A for that lockable component 11B.

The present invention may include a lock cover 12 dimensioned and shaped to physically associate with the lockout device 11C. The lock cover 12 provides a digital tag 16 operatively associated with a digital tag management system 20, wherein optically scanning, by way of a reader 11E, the digital tag 16 couples the reader 11E to the digital tag management system 20.

The lock cover 12 has a body portion 14 along a surface thereof, the digital tag 16 is provided. The body portion 14 may further provide a shank hole 14A and shank slot 14B for receiving two different portions, respectively, of a shackle of the lockout device 11C, whereby the lock cover 12 is secured by locking the safety lockout device 11C. The body portion 14 may further provide a key slot 114C so that a key 11D for the lockout device 11C can access a keyhole thereof. An authorized user 11A may have a retaining device 18 that operatively associates with the shank hole 14A of the lock cover 12, for the sake of facilitating transportation thereof, before or after it engages a lockout device 11C.

The authorized user 11A deploys lockout cover 12 onto a lockout device 11C (e.g., a standard safety lock, padlock, etc.) when performing lockout tagout procedures. Any subsequent user with a reader 11E can identify and contact the authorized user 11A of the lockout device 11C by scanning the digital tag 16. In many embodiments, the reader 11E is a mobile phone having a camera and QR scanning app for coupling the reader/mobile device 11E to the digital tag management system 20.

Figures 6, 7A, 7B, 7C, 7D:
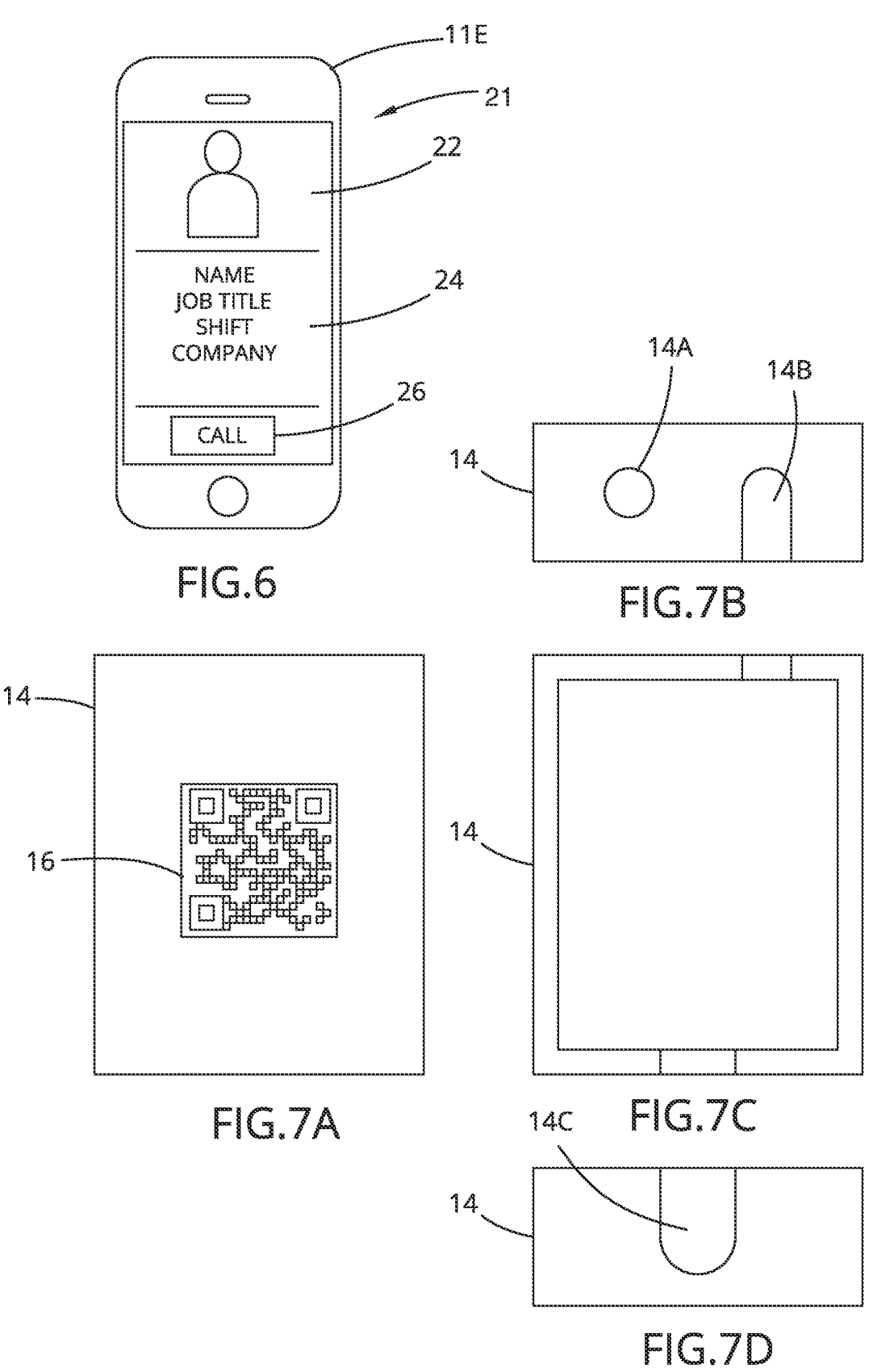
FIG. 6 is an elevation view of a mobile device/reader 11E in use.
FIG. 7A is an elevation view of an exemplary embodiment of a lockout body portion 14 of the present invention.
FIG. 7B is a top plan view of an exemplary embodiment of the lockout body portion 14 of the present invention.
FIG. 7C is a rear view of an exemplary embodiment of the lockout body portion 14 of the present invention.
FIG. 7D is a bottom view of an exemplary embodiment of the lockout body portion 14 of the present invention.
Figure 8:
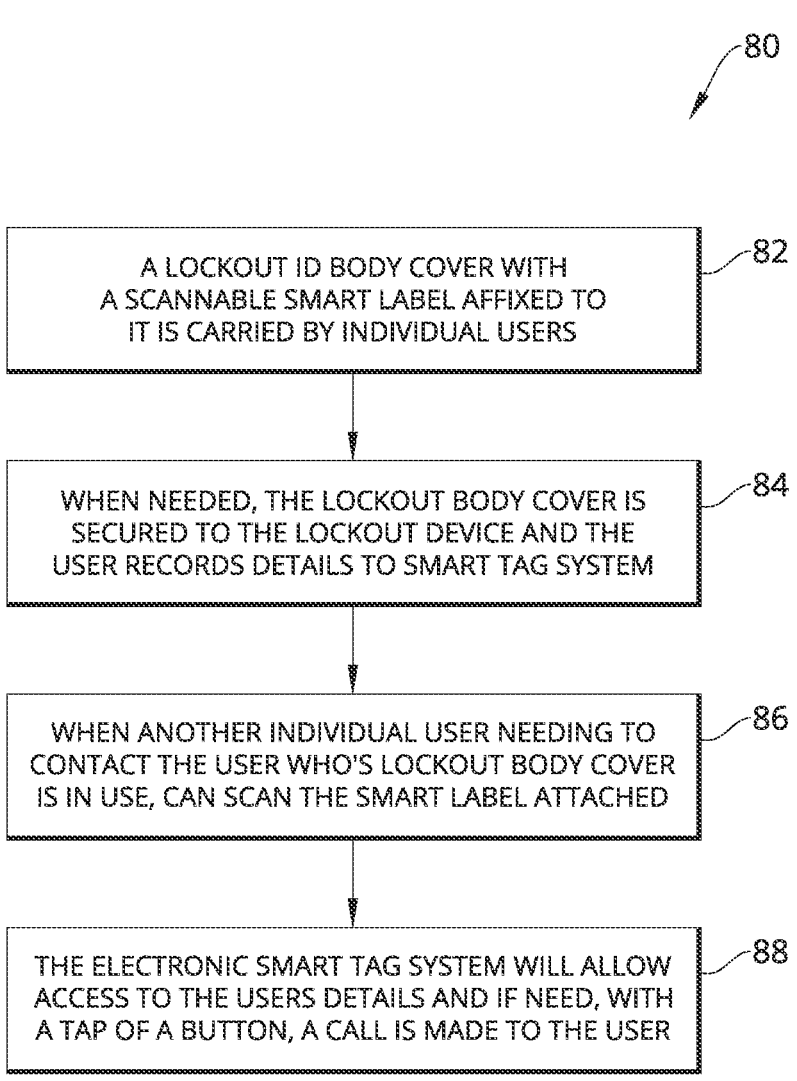
FIG. 8 is a flow chart of an exemplary embodiment of the present invention, diagrammatically illustrating the following modes, modules, and/or functionalities: Installation Workflow 80; Lockout ID carried by users 82; User attached Lockout ID to safety lock 84; User wanting owner information scans tag code 86; and Tag owner digital identity displayed 88.
Figures 9, 10:
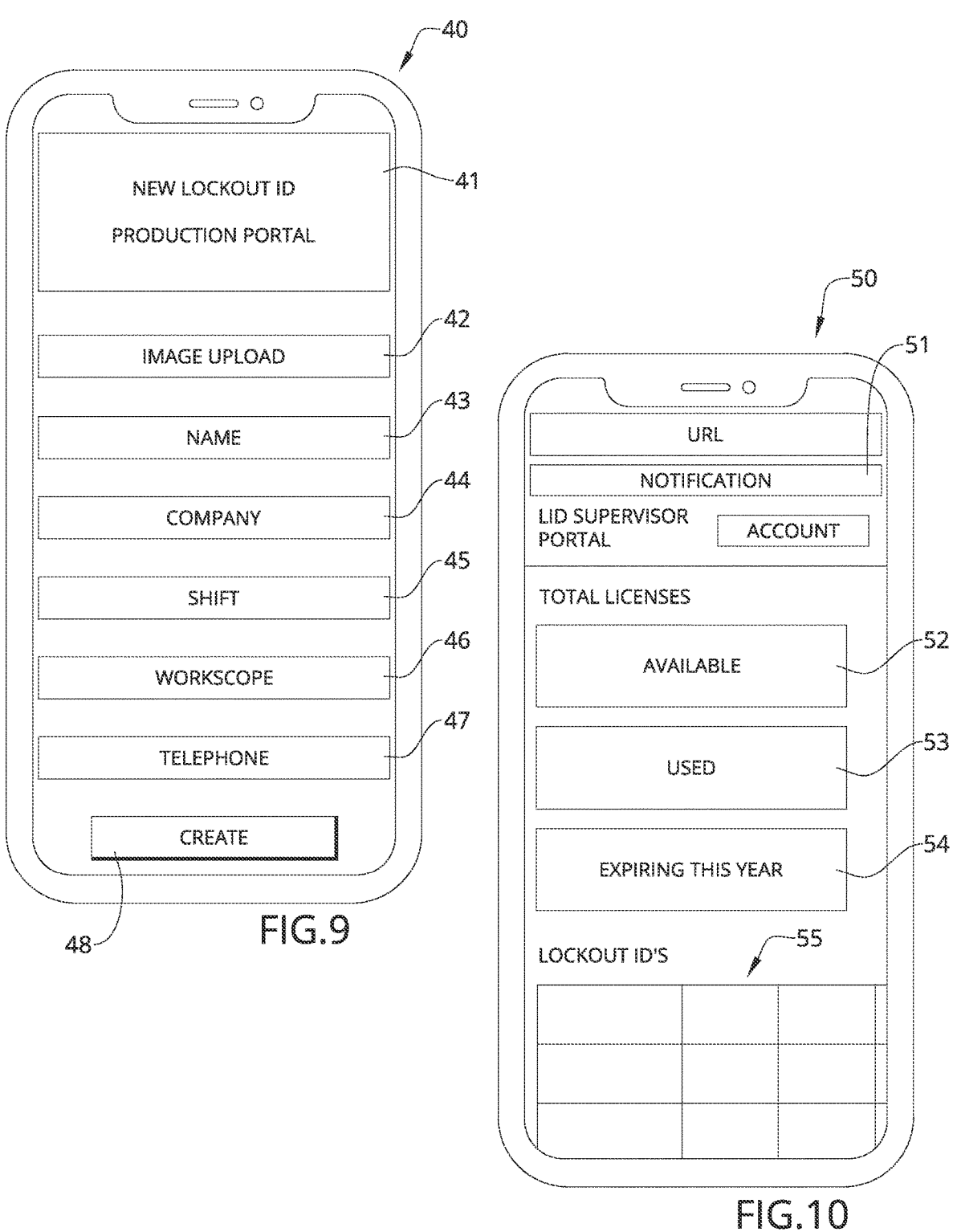
FIG. 9 is a schematic view of an exemplary embodiment of a user interface identification creation screen of the present invention, diagrammatically illustrating the following modes, modules, and/or functionalities: Mobile device 40; Lockout ID Portal New Tag Entry Banner 41; Image Upload Button 42; Worker Name Input 43; Company Name Input 44; Worker Shift Input 45; Worker Work-scope Input 46; Worker Mobile Number Input 47; Create new record button 48.
FIG. 10 is a schematic view of an exemplary embodiment of the mobile dashboard or user interface after creation screen of a user data set 24 on a mobile device 40, diagrammatically illustrating the following modes, modules, and/or functionalities: Notification Area 51; Count of available licenses 52; Count of currently used licenses 53; Count of expiring licenses 54; and Table of onboarded lockout id digital tags 55.
Figure 11:
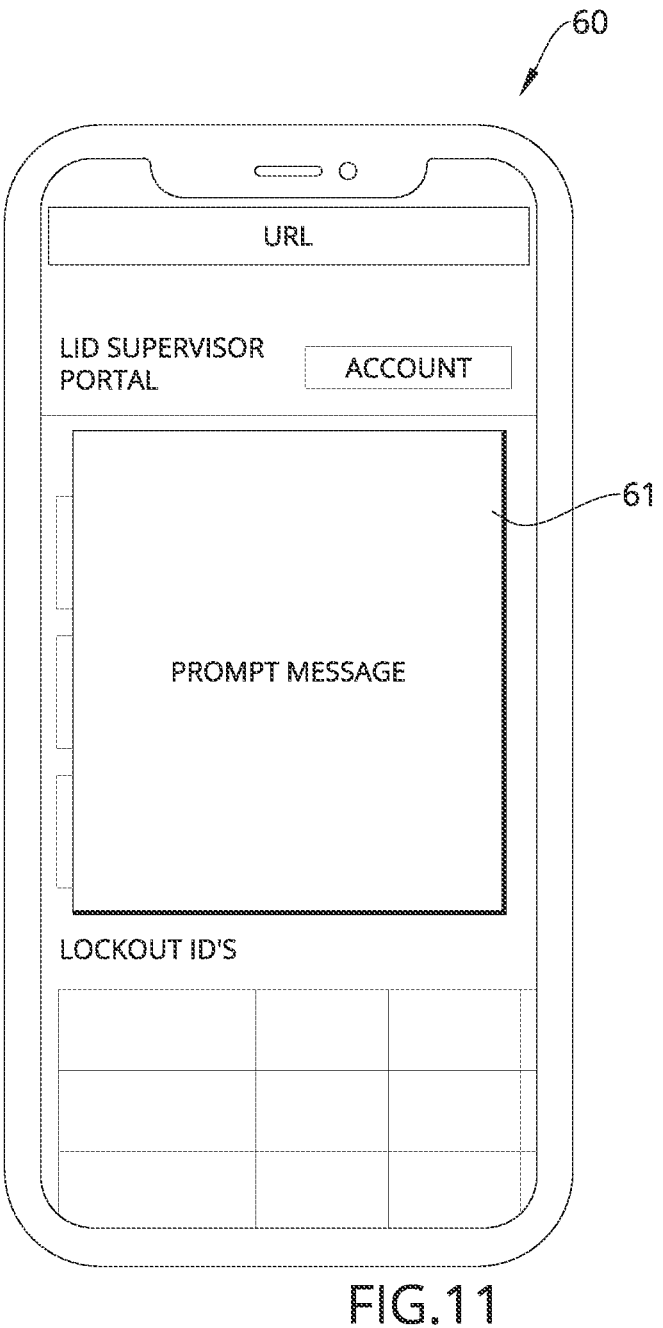
FIG. 11 is a schematic view of an exemplary embodiment of a master clear dialogue prompt, illustrating a module for important information 61.
Figure 12:
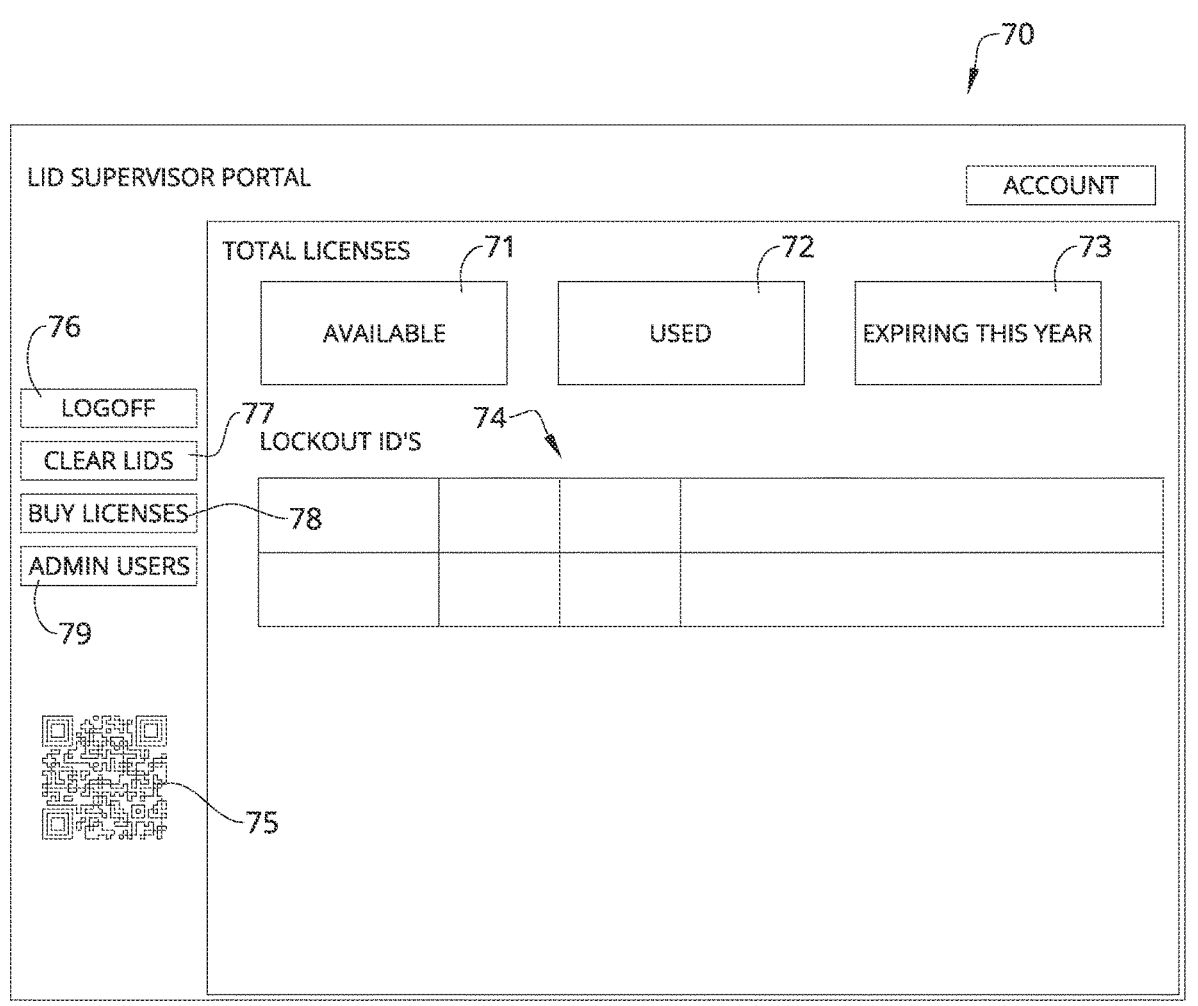
FIG. 12 is a schematic view of an exemplary embodiment of the desktop portal dashboard of the present invention, diagrammatically illustrating the following modes, modules, and/or functionalities: 70. Desktop portal in web browser; Available license count 71; Used license count 72; Count of expiring licenses 73; Table of onboarded lockout ID tags 74; Dynamic QR code which adds a calendar reminder to renew licenses 75; Logoff button 76; Bulk clear tag button 77; Button to purchase licenses 78; and Button to administer users (admin function) 79.
Figure 13:
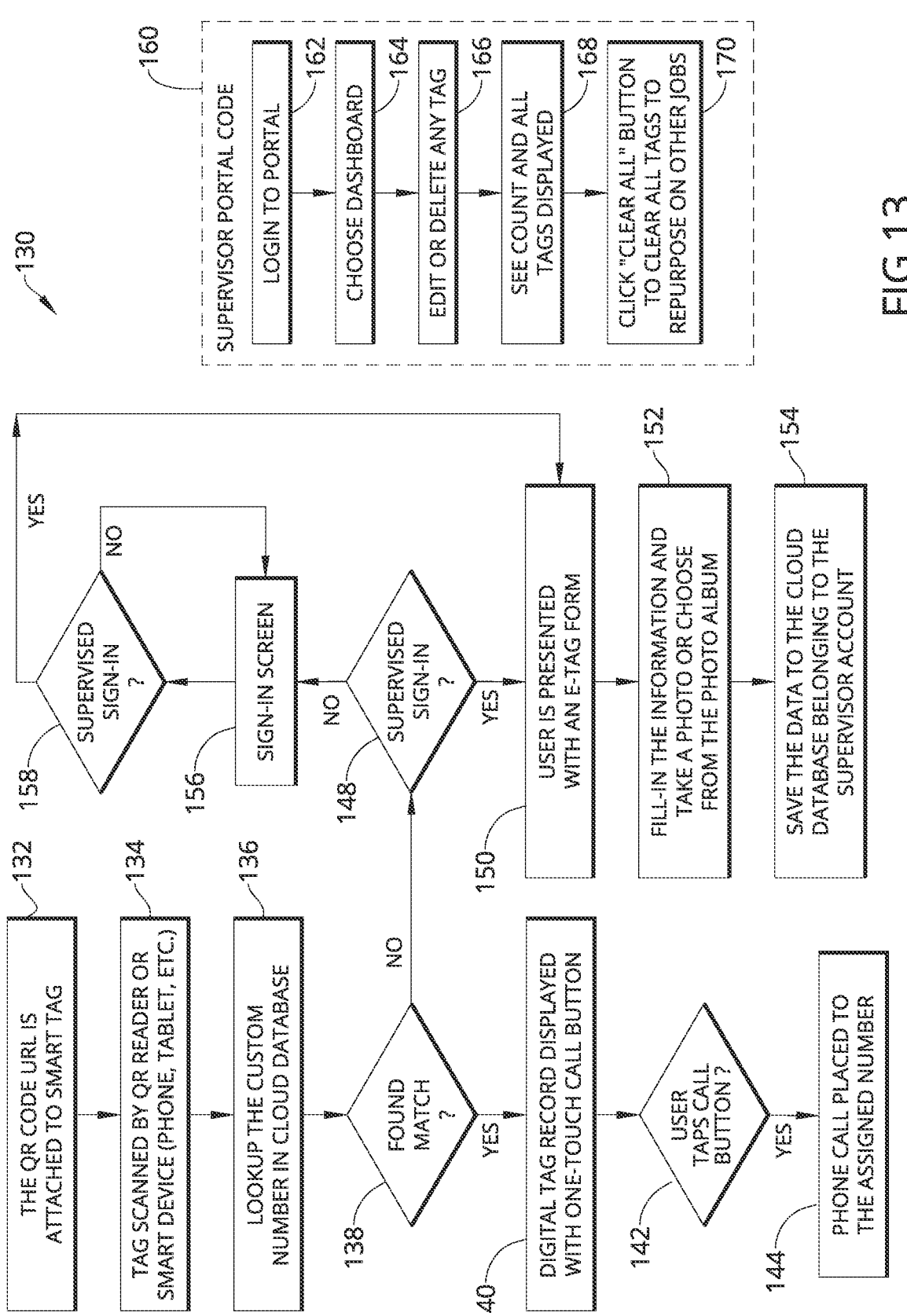
FIG. 13 is a flow chart of an exemplary embodiment of the present invention, diagrammatically illustrating the following modes, modules, and/or functionalities: workflow for product usage 130; QR code attached to the lockout ID body (at manufacturer) 132; Tag QR code is scanned by users smart device 134; Request made to search tag in cloud database 136; Result of search 138; Match is found and electronic tag record displayed 140; Waiting for call button tap 142; Call button tapped and call is placed to number stored in record 144; Match not found, supervisor login requested 148; Supervisor login accepted and new tag form presented 150; New tag form filled out and new or existing picture is attached to the record 152; New tag info saved to the cloud database and linked to supervisor account 154; Login screen shown 156; Login verification performed 158; Supervisor Logged in workflow 160; User logs in 162; User shows dashboard 164; User can manage existing tags 166; User can see status of licenses and tag counts 168; and User can clear all onboarded tags with clear lids button 170.

For the subsequent user, if the digital tag 16 does not provide the reader 11E with a data set regarding the authorized user 11A, i.e., a user data set 24, that reader 11E prompts the subsequent user to provide a new user data set. If the user data set 24 is already present in the digital tag management system 20, a smart label 21 is displayed along the user interface of reader 11E, as illustrated in FIG. 6. The smart label 21 includes a representation of the user data set 24, an image 22 of the authorized user 11A, and a call button 26.

During use, say, a supervisor or another individual needing to contact the authorized user 11A, whose lockout device 11C is affixed to equipment, opens their mobile device/reader 11E and scans the digital tab 16, whereby the electronic tagout record/smart label 21 is shown on the mobile device/reader 11E. The smart label 21 represents the first data set of user data along with an associated call button 26. With the tap of the call button 26, a call is made to the authorized user 11A.

Figure 14:
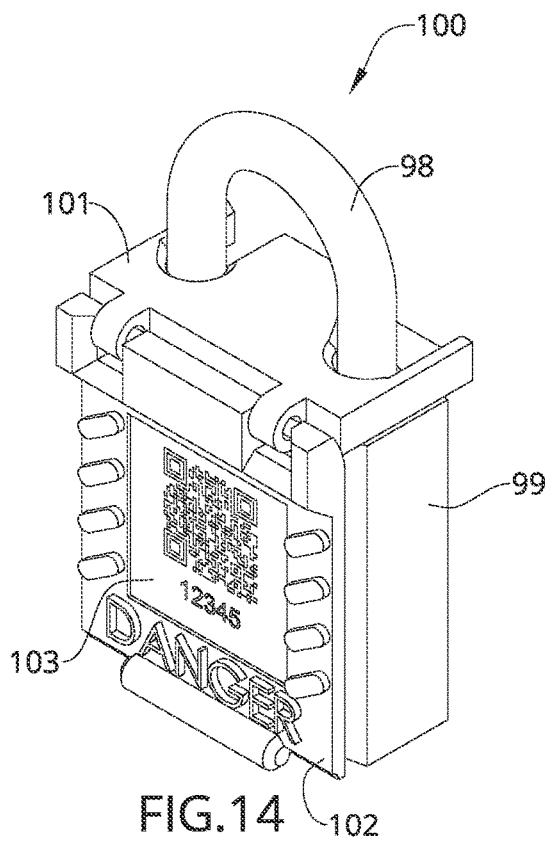
FIG. 14 is a perspective view of an exemplary embodiment of the present invention.
Figure 15:
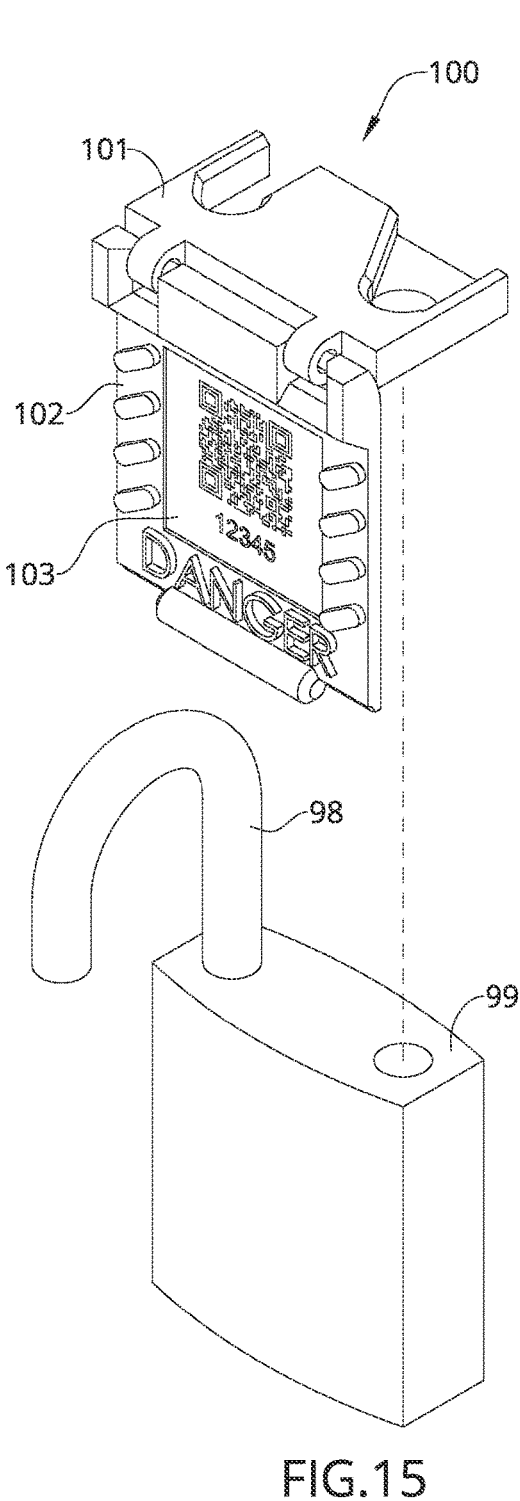
FIG. 15 is an exploded perspective view of an exemplary embodiment of the present invention.

The digital tag 16 may be a QR smart code configured to link to the digital tag management system 20 via a backend web application. The backend web application checks a database for the user data set, which if present enables the smart label 21 to be displayed on the reader 11E with a user image 22, the user data set 24, and the call button 26. If the user data set 24 is not yet present in the digital tag management system 20, users will be prompted to upload a photo and user data to the digital tag management system 20. In some embodiment, the digital tag 16 can be affixed directly to the lockout device 11C, as illustrated in FIGS. 14 and 15, disclosing a safety lock shackle 98, a safety lock body 99, a safety lock with lockout id attached 100, a top 101 of lockout id connecting surface attached to safety lock shackle, a front 102 of lockout id tag, and custom coded unique QR code 103 referencing the digital record of the digital tag management system 20.

Additionally, the present invention can be used in any application which seeks to identify an owner, where writing space is limited. Also, the smart label 21 can be affixed to any device and any size to allow access to dynamic data.

The digital tag 16 of the present disclosure may have data permanently written to the tag at the time of manufacture or set-up, and/or may have data written to the digital tag 16 when the digital tag 16 is put into use.

The digital tag 16 may include an equipment field configured to store data relating to the equipment associated with the digital tag 16. The equipment field of the digital tag 16 stores digital tag information. If the digital tag 16 is associated with a location, the digital tag 16 may include a field for the name or description of the location, the energy type for the location, a list of approved equipment or authorized users 11A for the location, or other information relating to the location. As another example, if the digital tag 16 is associated with a lockout device 11C, a user field of the digital tag 16 may store data relating to the authorized user(s) 11A who have checked out the lockout device 11C, time/date information relating to when the lockout device 11C was previously locked or unlocked, etc. The data may further include a serial number, product type, part number, or any other type of identifier that identifies the lockable component 11B that is being locked out by the lockout device 11C. The equipment and user data may be stored as any type of data (encrypted data, unencrypted data) in any format, and reader 11E may be configured to interpret the data. In one embodiment, a the digital tag 16 comprises a portal that contains a dynamically generated QR code, which creates an optional renew reminder for licensing based on the age of the tags.

Reader 11E may be configured to read the data (e.g., the user data in the user database) from the digital tag 16. Reader 11E may receive the user data and store the data in an item database of reader 11E or transmit the data elsewhere. In one embodiment, reader 11E may be a computing device enabled to store the user data until the user data may be transmitted to a local or remote computer. In another embodiment, reader 11E may be a smartcard and the user data may be stored in a module of the mobile device when the data is read from the digital tag 16.

Figure 16:
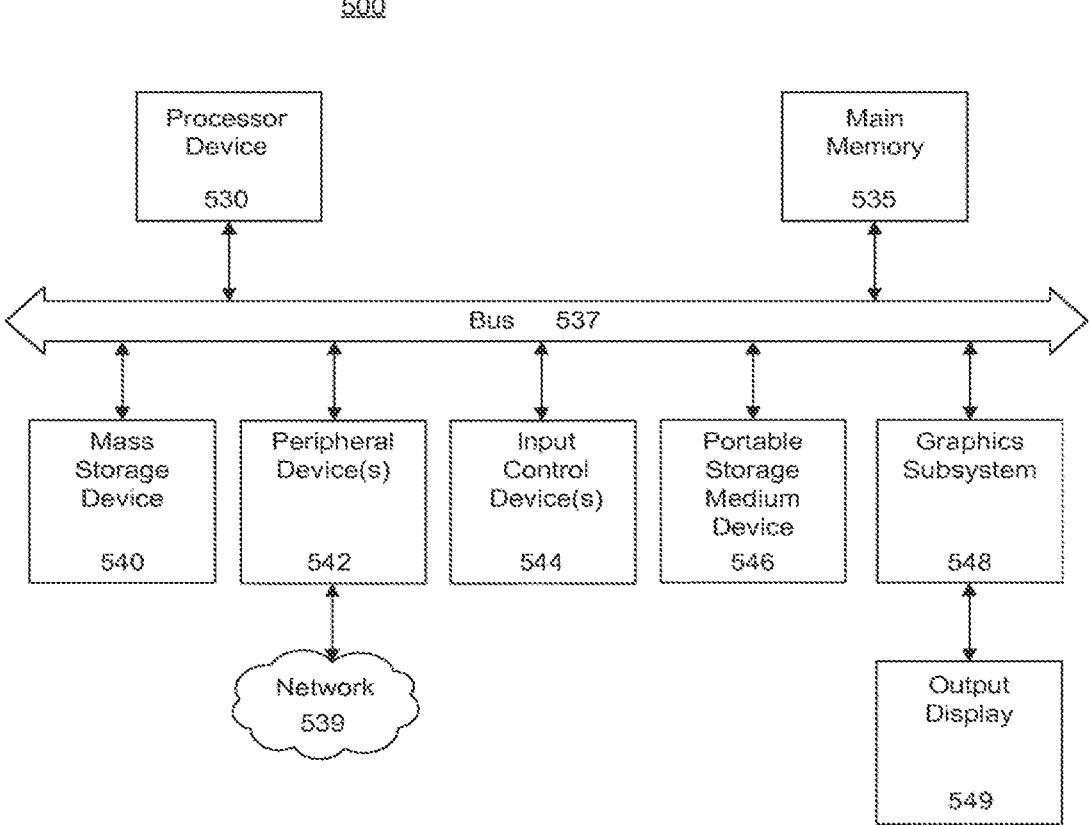
FIG. 16 is a block diagram of a general and/or special purpose computer 500, which may be a general and/or special purpose computing device, in accordance with some of the example embodiments of the invention. The computer 500 may be, for example, a user device, a user computer, a client computer and/or a server computer, among other things.

Referring now to FIG. 16 which is a block diagram of local computer 11E or remote computer/server, according to an exemplary embodiment. The computer 500 may include without limitation a processor device 530, a main memory 535, and an interconnect bus 537. The processor device 530 may include without limitation a single microprocessor or may include a plurality of microprocessors for configuring the computer 500 as a multi-processor system. The main memory 535 stores, among other things, instructions and/or data for execution by the processor device 530. The main memory 535 may include banks of dynamic random-access memory (DRAM), as well as cache memory.

The computer 500 may further include a mass storage device 540, peripheral device(s) 542, non-transitory storage medium device(s) 546, input control device(s) 544, a graphics subsystem 548, and/or a display 549. For explanatory purposes, all components in the computer 500 are shown in FIG. 16 as being coupled through the bus 537. However, the computer 500 is not so limited. Devices of the computer 500 may be coupled through one or more data transport means. For example, the processor device 530 and/or the main memory 535 may be coupled through a local microprocessor bus. The mass storage device 540, peripheral device(s) 542, portable storage medium device(s) 546, and/or graphics subsystem 548 may be coupled via one or more input/output (I/O) buses. The mass storage device 540 may be a non-volatile storage device for storing data and/or instructions for use by the processor device 530. The mass storage device 540 may be implemented, for example, with a magnetic disk drive or an optical disk drive. In a software embodiment, the mass storage device 540 is configured for loading contents of the mass storage device 540 into the main memory 535.

The portable storage medium device 546 operates in conjunction with a nonvolatile portable storage medium, such as, for example, a compact disc read only memory (CD-ROM), to input and output data and code to and from the computer 500. In some embodiments, the software for storing information may be stored on a portable storage medium and may be inputted into the computer 500 via the portable storage medium device 546. The peripheral device(s) 542 may include any type of computer support device, such as, for example, an input/output (I/O) interface configured to add additional functionality to the computer 500. For example, the peripheral device(s) 542 may include a network interface card for interfacing the computer 500 with a network 439.

The input control device(s) 544 provide a portion of the user interface for a user of the computer 500. The input control device(s) 544 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the computer 500 may include the graphics subsystem 548 and the output display 549. The output display 549 may include a cathode ray tube (CRT) display and/or a liquid crystal display (LCD). The graphics subsystem 548 receives textual and graphical information, and processes the information for output to the output display 549.

Each component of the computer 500 may represent a broad category of a computer component of a general and/or special purpose computer. Components of the computer 500 are not limited to the specific implementations provided here.

Software embodiments of the example embodiments presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, CD-ROMs, and magneto-optical disks or other types of media/machine-readable medium suitable for storing or transmitting electronic instructions. The techniques described herein are not limited to any software configuration. They may find applicability in any computing or processing environment. The terms "computer-readable", "machine-accessible medium" or "machine-readable medium" used herein shall include any medium that can store, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Portions of the example embodiments of the invention may be conveniently implemented by using a conventional general-purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD or CD-ROM, a micro-drive, a magneto-optical disk, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above. Included in the programming and/or software of the general and/or special purpose computer or microprocessor are software modules for implementing the procedures described above.

In one embodiment, a local computer (i.e., associated with the mobile device) is configured to receive data from reader 11E and to transmit the data to a remote computer/server for processing or analysis. Local computer 114 may be a laptop, tablet, or other mobile device, or may be a device local to the location where the LOTO system is implemented. In one embodiment, a remote computer may be a server configured to manage all tagging and locking activities associated with the digital tag management system 20 The computers (including server) include a processing circuit, processor, memory, communications device, I/O interface as described below.

Memory 535 includes various modules for completing the systems and methods described herein. The modules may include the following: Mobile Supervisor Login Screen, Mobile Supervisor Signup Screen, Mobile Welcome Screen with training videos, Mobile Flyout Menu, Mobile Create New Lockout ID Screen, Mobile Create New Lockout ID Screen Filled Out With New Photo, Mobile Dashboard After Creation Of New Lockout ID, Mobile Flyout Menu From Dashboard, Edit Lockout ID Screen, Master Clear Dialogue Prompt, Master Clear Confirmation Message, Already Onboarded Second Scan Results, Results of Single Touch-Dial, iPhone Calling From Button Press, Scanning Desktop Portal Renew Reminder QR Code, Results in Phone Of Scanning Renew Reminder QR Code, Desktop Portal Dashboard, Desktop Portal Dashboard Delete Tags Prompt, Desktop Portal Dashboard With Renew Reminder QR Code, and a Desktop Portal Dashboard Account Frozen Screen modules.

The Mobile Supervisor Login Screen module may be configured as a cloud portal system/database is secured by opt-in and encrypted sign-in, wherein when supervisor accounts are created, a verification email is sent to the email used to sign-up. The email must be acknowledged before login is possible for the first time. This prevents spam accounts using fake email addresses. Account credentials are encrypted in the cloud database and all aspects are protected with standard SSL encryption. This login takes advantage of built-in smart device features such as biometric fingerprint and face ID to allow quick login access to the portal.

Mobile Supervisor Signup Screen module can be configured so that a predetermined individual can create a supervisor account, which is required to use lockout IDs. Abuse is discouraged using email verification emails, which must be acknowledged prior to login access being granted.

Mobile Welcome Screen module can be configured so that, with training videos, the main welcome screen features links to the latest onboarding and training videos related to operation of the solution.

Mobile Flyout Menu module can be configured so that a flyout menu provides a mobile friendly means of navigating the portal menu structure. The flyout menu covers the main screen and allows access to important features.

Mobile Create New Lockout ID Screen module can be configured so that when a supervisor is logged in and a new or cleared tag (not onboarded) is scanned, the new lockout ID screen allows for the digital tag details to be filled in and associated with that tag. The data remains in place until it is cleared and reissued or edited by the supervisor. Once new tag details are saved, the tag is linked to the single supervisor and is not able to be cleared or altered by anyone else. Mobile Create New Lockout ID Screen module can be further configured so that a newly created lockout ID screen can be filled out with a new photo, wherein the lockout ID contains a worker image to help with visual identification. A photo may be snapped right away using the smart device camera or chosen from the internal photo reel.

Mobile Dashboard After Creation module can be configured so that the mobile dashboard lists all the onboarded lockout ID tags presently associated with the logged in supervisor account. From here, the tags may be edited or deleted entirely.

Mobile Flyout Menu module can be configured so that the dashboard flyout menu provides a mobile friendly means of navigating the portal menu structure. The flyout menu covers the main screen and allows access to important features.

Edit Lockout ID Screen module can be configured so that the edit lockout id screen allows all aspects of the digital stored identity to be altered at any time and be instantly available to new scans. This includes photos, work-scopes, names, shifts, telephone numbers and company affiliation.

Master Clear Dialogue Prompt module can be configured so that the clear dialog prompt allows for the bulk deleting or offboarding of all tags at once, saving time when large numbers of tags are being used on a job and at the completion of a normal job activity. This function essentially resets the tags to status of new for ease of reuse by any account.

Master Clear Confirmation Message module can be configured so that because the clear action is destructive, a confirmation dialogue must be approved to carry out the operation. If the action was unintentional, then the dialogue can be cancelled, and the action will also be cancelled and not carried out.

Already Onboarded Second Scan Results module can be configured so that anyone is able to scan a lockout ID QR code. In the second scan or already onboarded case, worker details are immediately displayed, and the scanner is enabled to use the one touch feature to call the worker.

Results of Single Touch-Dial module can be configured so that the single touch dial leverages the internal functionality of mobile phones to place calls based on web application programming interfaces. Tapping the button instantly places a call to the number associated with the record being scanned.

Calling From Button Press module can be configured so that a single touch call button can be activated from any mobile phone.

Scanning Desktop Portal Renew Reminder QR Code module can be configured so that the dynamic desktop portal reminder QR code is programmatically generated based on the age of the tags being supervised. If this code is scanned with a smart device, a calendar event for the proper date is generated to make reorder reminders convenient.

Scanning Renew Reminder QR Code module can be configured so that scanning the reminder QR code with a mobile phone will create a call event (e.g., an iCal even for iPhone™ users) with the renewal date and title of Renewal reminder for Lockout ID prepopulated. The user can click save to save in their in-phone calendar application.

Desktop Portal Dashboard module can be configured so that is a portal is a larger area view of the lockout ID portal, which is able to be viewed on tablets, servers, workstations, laptops or the like. This allows management access to the lockout id tags from anywhere that there is an internet connection.

Desktop Portal Dashboard Delete Tags Prompt module can be configured so that the desktop portal also features a prompt when performing destructive actions, such as deleting or clearing tags. The user is enabled to approve the action or cancel the action entirely.

Desktop Portal Dashboard with Renew Reminder QR Code module can be configured so that when scanning the renew reminder on the desktop portal the smartphone or tablet doing the scanning will receive an iCal compatible event creation screen pre-populated with the date and title of renewal of lockout id licenses.

Desktop Portal Dashboard Account Frozen Screen module can be configured so that the desktop portal has an account frozen notification, which allows for a restricted use case of the portal. New tags and editing are disabled for all associated tags. The delete and clear options are still available. This account freezing can only be enabled by the manufacturer and is typically deployed when accounts are closed, or licensing has lapsed. This activity can be enabled or disabled by the manufacturer.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A lockout-tagout (LOTO) system, comprising:
a lock mechanism configured to physically lock a LOTO equipment;
a two-dimensional matrix barcode connected to the lock mechanism; and
a cloud-based lock management system (CBLMS) comprising a systemic processor operatively associated with a systemic database and a plurality of computing devices, wherein the systemic database comprises authorized data of a plurality of authorized users, wherein each authorized data comprises user information of the associated authorized user of the plurality of authorized users, and wherein the CBLMS comprises instructions that:
upon scanning of the two-dimensional matrix barcode by a first computing device of the plurality of computing devices associated with a first authorized user of the plurality of authorized users, store in the systemic database a first shift period of said first authorized user;
upon subsequent scanning of the two-dimensional matrix barcode by a second computing device of the plurality of computing devices associated with a second authorized user of the plurality of authorized users both:
store in said systemic database a second shift period of said second authorized user; and
determine a match of the first shift period and the second shift period such that:
upon determining the match, open a call user interface on the second computing device and render user information of said first authorized user thereon and a call button enabling one-touch dialing between the second computing device and the first computing device via tapping on the call button; and
upon failure to determine the match, open a supervisor sign-in user interface,
whereby a digital record of the first and second shift periods resides on the systemic database.

2. The LOTO system of claim 1, wherein each user information includes a photo of the associated authorized user.

3. The LOTO system of claim 2, wherein each user information includes a phone number of the associated authorized user.

4. The LOTO system of claim 3, wherein the phone number is called via the one-touch dialing.

5. The LOTO system of claim 4, wherein each user information includes a shift identifier associated with the associated authorized user.

6. The LOTO system of claim 5, wherein each user information includes a company associated with the associated authorized user.

7. The LOTO system of claim 5, wherein each computing device is a mobile phone.

\* \* \* \* \*